United States Patent [19]

Heine et al.

[11] 4,095,161
[45] June 13, 1978

[54] VARIABLE STEPPING-ANGLE SYNCHRONOUS MOTOR

[75] Inventors: Günter Heine, Seelbach; Claus Schäffer, Heiligenzell, both of Germany

[73] Assignee: Gerhard Berger GmbH & Co. Fabrik Elektrischer Messgeräte, Lahr, Germany

[21] Appl. No.: 696,310

[22] Filed: Jun. 15, 1976

[30] Foreign Application Priority Data

Jun. 13, 1975 Germany .............................. 2526564

[51] Int. Cl.² .............................................. G05B 19/40
[52] U.S. Cl. .................................. 318/696; 310/49 R
[58] Field of Search ....................... 318/138, 254, 696; 310/49

[56] References Cited

U.S. PATENT DOCUMENTS

| | | | |
|---|---|---|---|
| 3,204,136 | 8/1965 | Kaiwa et al. | 318/696 X |
| 3,609,500 | 9/1971 | Causer et al. | 318/696 |
| 3,842,332 | 10/1974 | Heine et al. | 318/696 |
| 3,866,104 | 2/1975 | Heine | 318/696 |

Primary Examiner—Gene Z. Rubinson
Attorney, Agent, or Firm—Norbert P. Holler

[57] ABSTRACT

In the disclosed motor arrangement, a single stator operates with one of eight rotors having a number of teeth equal to $Z_R = 5u(n + 1) \pm gu$. In the equation, $n$ is one less than the number of teeth on each pole of the stator, $u$ is equal to the number of pole groups, and $g$ is any integer varying from 1 to 4. Energizing the poles of the motor is one of five winding arrangements. The motor, with a single stator, is capable of stepping at one of 40 stepping angles.

6 Claims, 33 Drawing Figures

Stator with n=1, u=2, g= 4 k=1

Stator with n=1, u=2, g= 3

Stator with n=1, u=2, g=2

Stator with n=1, u=2, g=1

Stator with n=1, u=2, g=-1

Stator with n=1, u=2, g=-2

Stator with n=1, u=2, g=-3

Stator with n=1, u=2, g=-4

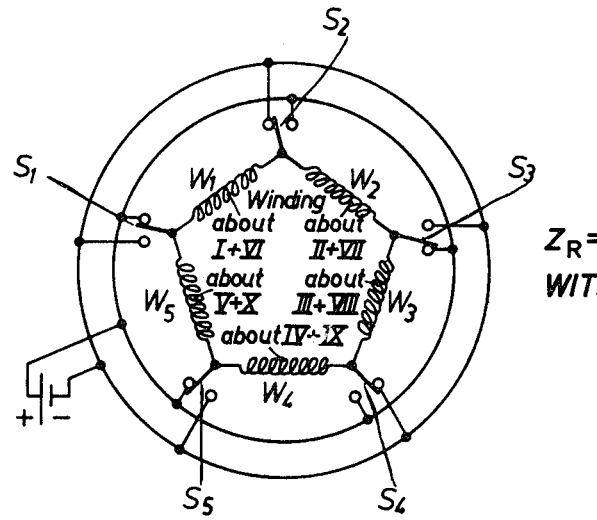
Fig. 11
$Z_R = 5u(n+1) \pm g \cdot u$
WITH $g=2$ AND $g=3$
Fig. 12
| SWITCHING SEQUENCE AND RESULTING POLARITIES ||||||||||||
| STEP \ PHASE | $W_1$ I | VI,II | $W_2$ VII,III | $W_3$ VIII,IV | IX | $W_4$ V | X | $W_5$ | S |
|---|---|---|---|---|---|---|---|---|---|
| 0 | N | | S | N | | S | | O | — |
| 1 | O | | S | N | | S | | N | 1 |
| 2 | S | | O | N | | S | | N | 2 |
| 3 | S | | N | O | | S | | N | 3 |
| 4 | S | | N | S | | O | | N | 4 |
| 5 | S | | N | S | | N | | O | 5 |
| 6 | O | | N | S | | N | | S | 1 |
| 7 | N | | O | S | | N | | S | 2 |
| 8 | N | | S | O | | N | | S | 3 |
| 9 | N | | S | N | | O | | S | 4 |
| 10 | N | | S | N | | S | | O | 5 |
| 11=1 | O | | S | N | | S | | N | 1 |
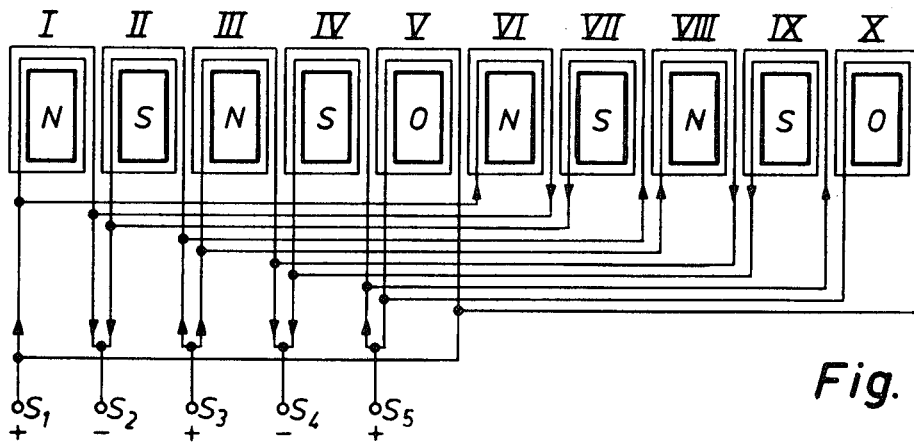
Fig. 13

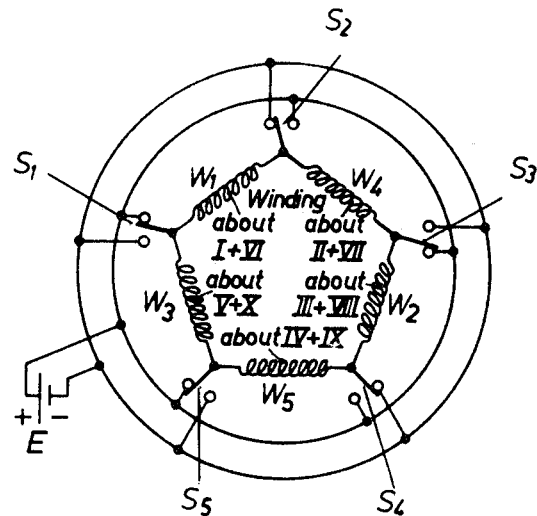
Fig. 14
$Z_R = 5u(n+1) \pm g \cdot u$
WITH $g=1$ AND $g=4$
Fig. 15
| SWITCHING SEQUENCE AND RESULTING POLARITIES | | | | | | |
|---|---|---|---|---|---|---|
| STEP \ PHASE | $W_1$ I VI,II | $W_4$ VII,III | $W_2$ VIII,IV | $W_5$ IX,V | $W_3$ X | S |
| 0 | N | S | N | S | O | — |
| 1 | O | S | N | S | N | 1 |
| 2 | S | O | N | S | N | 2 |
| 3 | S | N | O | S | N | 3 |
| 4 | S | N | S | O | N | 4 |
| 5 | S | N | S | N | O | 5 |
| 6 | O | N | S | N | S | 1 |
| 7 | N | O | S | N | S | 2 |
| 8 | N | S | O | N | S | 3 |
| 9 | N | S | N | O | S | 4 |
| 10 | N | S | N | S | O | 5 |
| 11=1 | O | S | N | S | N | 1 |
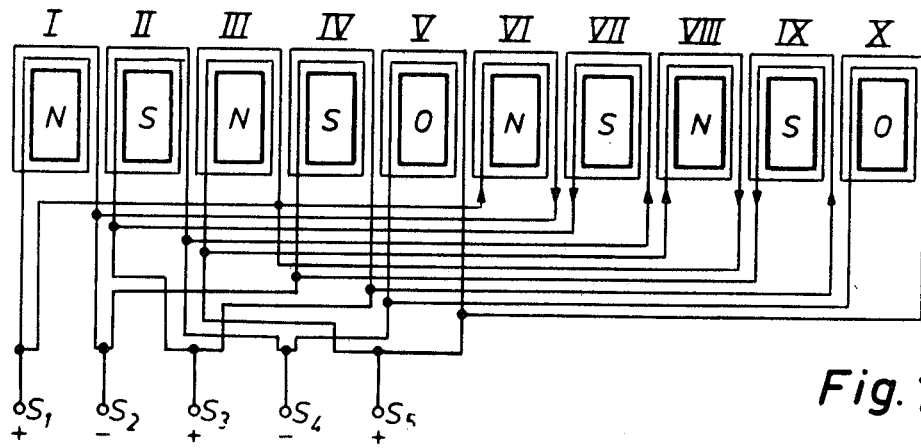
Fig. 16

SWITCHING SEQUENCE AND RESULTING POLARITIES

| STEP \ PHASE | W₁ | W₂ | W₃ | W₄ | W₅ | S |
|---|---|---|---|---|---|---|
| 0 | N | S | N | S | N | 6 |
| 1 | 0 | S | N | S | N | 7 |
| 2 | S | S | N | S | N | 8 |
| 3 | S | 0 | N | S | N | 9 |
| 4 | S | N | N | S | N | 10 |
| 5 | S | N | 0 | S | N | 11 |
| 6 | S | N | S | S | N | 12 |
| 7 | S | N | S | 0 | N | 13 |
| 8 | S | N | S | N | N | 14 |
| 9 | S | N | S | N | 0 | 15 |
| 10 | S | N | S | N | S | 6 |
| 11 | 0 | N | S | N | S | 7 |
| 12 | N | N | S | N | S | 8 |
| 13 | N | 0 | S | N | S | 9 |
| 14 | N | S | S | N | S | 10 |
| 15 | N | S | 0 | N | S | 11 |
| 16 | N | S | N | N | S | 12 |
| 17 | N | S | N | 0 | S | 13 |
| 18 | N | S | N | S | S | 14 |
| 19 | N | S | N | S | 0 | 15 |
| 20 | N | S | N | S | N | 6 |
| 21 | 0 | S | N | S | N | 7 |

| SWITCHING SEQUENCE AND RESULTING POLARITIES ||||||||||||
| WINDING STEP | WINDINGS |||||||||| S |
| | I | VI | II | VII | III | VIII | IV | IX | V | X | |
|---|---|---|---|---|---|---|---|---|---|---|---|
| 0 | N | N | S | S | N | N | S | S | N | N | |
| 1 | 0 | N | S | S | N | N | S | S | N | N | |
| 2 | 0 | 0 | S | S | N | N | S | S | N | N | |
| 3 | S | 0 | S | S | N | N | S | S | N | N | |
| 4 | S | S | S | S | N | N | S | S | N | N | |
| 5 | S | S | 0 | S | N | N | S | S | N | N | |
| 6 | S | S | 0 | 0 | N | N | S | S | N | N | |
| 7 | S | S | N | 0 | N | N | S | S | N | N | |
| 8 | S | S | N | N | N | N | S | S | N | N | |
| 9 | S | S | N | N | 0 | N | S | S | N | N | |
| 10 | S | S | N | N | 0 | 0 | S | S | N | N | |
| 11 | S | S | N | N | S | 0 | S | S | N | N | |
| 12 | S | S | N | N | S | S | S | S | N | N | |
| 13 | S | S | N | N | S | S | 0 | S | N | N | |
| 14 | S | S | N | N | S | S | 0 | 0 | N | N | |
| 15 | S | S | N | N | S | S | N | 0 | N | N | |
| 16 | S | S | N | N | S | S | N | N | N | N | |
| 17 | S | S | N | N | S | S | N | N | 0 | N | |
| 18 | S | S | N | N | S | S | N | N | 0 | 0 | |
| 19 | S | S | N | N | S | S | N | N | S | 0 | |
| 20 | S | S | N | N | S | S | N | N | S | S | |
| 21 | 0 | S | N | N | S | S | N | N | S | S | |
| 22 | 0 | 0 | N | N | S | S | N | N | S | S | |
| 23 | N | 0 | N | N | S | S | N | N | S | S | |

VARIABLE STEPPING-ANGLE SYNCHRONOUS MOTOR

RELATED COPENDING APPLICATIONS

This application is related to the copending application of Günter Heine, Ser. No. 500,001, filed Aug. 23, 1974, now U.S. Pat. No. 4,000,452 issued Dec. 28, 1976, and assigned to the same assignee as the present application. The subject matter of that application (and therewith also the subject matter of its predecessor application Ser. No. 379,223 filed July 16, 1973, now U.S. Pat. No. 3,866,104 issued Feb. 11, 1975) is hereby made a part of the present application as fully recited therein.

BACKGROUND OF THE INVENTION

This invention relates to electrical stepping motors and particularly to stepping motor structural arrangements and manufacturing methods which afford motors capable of a wide variety of stepping angles.

Stepping motors are capable of rotating in steps over precise angles in response to particular applied current.

U.S. Pat. No. 3,842,332 discloses such a stepping motor. Here five phase windings $W_1$-$W_5$ are disposed on $5u$ stator poles, such as $5 \times 2$ stator poles I, II, III, . . . X (with $u = 2$). The factor $u$ is an integer. It indicates the number of stator poles having the same polarity among the phases.

To maintain the accuracy available from stepping motors, it is undesirable for a stepping motor to apply its rotation through intermediate angle multipliers such as gears which might reduce the step prevision. For stepping motors to apply rotation directly to a load each stepping motor must move through the same stepping angle required by the load.

In order to satisfy the wide variety of stepping angle requirements of stepping motor users, a stepping motor manufacturer must carry a large inventory of electrical sheet-steel stator laminations. Normally each different lamination type is used for one size of stepping angle. However, the different dies for cutting each type of lamina are expensive. Also, the number of stepping motors manufactured for many applications is often small. Thus the extensive inventory is quite uneconomical.

Attempts have been made to reduce the extent of the variety of stator laminae required in inventory and still allow assembly of motors with a wide range of stepping angles and speeds. One such attempt is disclosed in the aforesaid copending U.S. patent application Ser. No. 500,001. This involved changing the stepping angle $\phi$ of the motor in the aforementioned U.S. Pat. No. 3,842,332 into five different stepping angles $\phi/4$, $\phi/2$, $\phi$, $1.25\phi$, and $2.5\phi$ within one and the same motor, by changing the winding connection and drive connections. The motor connection for the largest stepping angle could be operated as a two-phase synchronous motor. With a stator of given electrical sheet-steel lamina and a given rotor, it is possible to obtain five different stepping angles from the same motor structure.

However five stepping angles are only a small fraction of the desired stepping angles.

The aforementioned application also discloses that the motor operates even when, within a limited region, the stator tooth pitch $T_s$ varies relative to the rotor tooth pitch $T_R$. Specifically it shows that $T_s$ may vary between $0.9T_R$ and $1.1 [(n + k + 0.6)/(n + k)]T_R$, where $n$ is the whole number of stator tooth spaces per stator pole, and $k$ is the whole number of stator tooth pitches that fit between poles.

An object of this invention is to improve stepping motors.

Another object of this invention is to improve stepping motor manufacturing systems and methods.

Another object of the invention is to make it possible to obtain a large number of possible stepping angles from a limited number of and possibly one stator laminae shape.

SUMMARY OF THE INVENTION

According to a feature of the invention, these objects are obtained in whole or in part by constructing the stator of the motor and the motor windings in accordance with the teachings of the aforementioned application Ser. No. 500,001 which was filed Aug. 23, 1974, and constructing the rotor so that the number of teeth $Z_R = 5u(n + 1) \pm gu$, where $1 \leq g \leq 4$. Thus, $g = -4, -3, -2, -1, 1, 2, 3, 4$.

According to more specific features of the invention, the stepping motor is provided with stator windings forming a plurality of connecting points, a permanent magnet rotor, control means connected to the five connecting points for energizing the windings, the motor having a stator including $u$ stator pole groups each having five poles, each of the five poles having $n + 1$ pole teeth, where $n$ is a whole number equal to or greater than zero, the control means connecting the windings so as to permit operation in one of five stepping angle modes and in one of a five phase or a two phase relationship, the motor having a rotor with a number of teeth $$Z_R = 5u(n + 1) \pm g u,$$

where $1 \leq g \leq 4$.

These and other features of the invention are pointed out in the claims. Other advantages of the invention will become evident from the following detailed description when read in light of the accompanying drawings.

BRIEF DESCRIPTION OF THE DRAWINGS

In the drawings:

FIGS. 11 to 13 and 14 through 16 are respectively circuit diagrams, switching sequence tables, and pole winding and energizing arrangements for the circuits in FIGS. 1 to 10, and embodying features of the invention.

DESCRIPTION OF PREFERRED EMBODIMENTS

Figure 1:
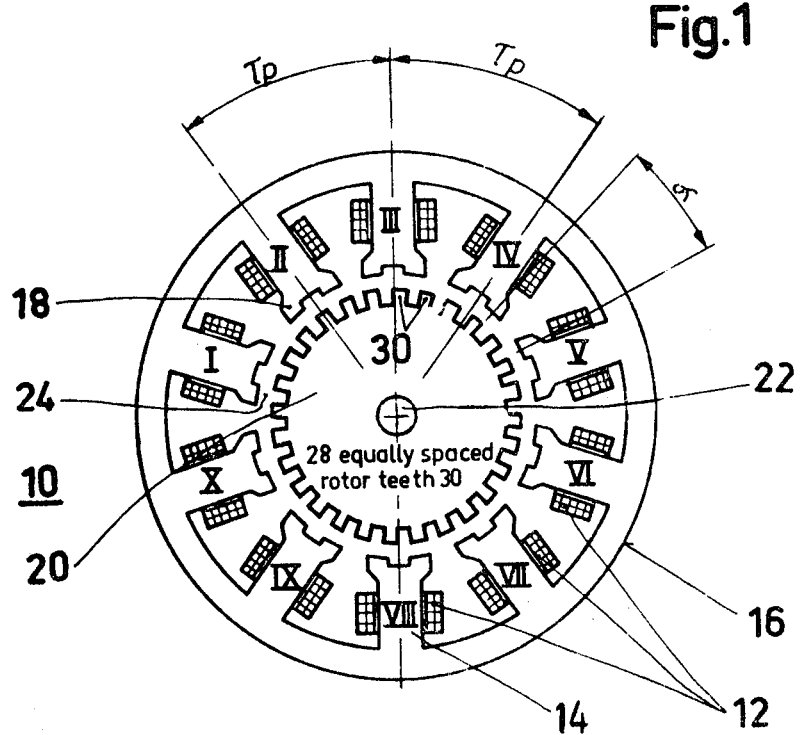
FIG. 1 is a sectional view of one motor structure embodying features of the invention.
Figure 2:
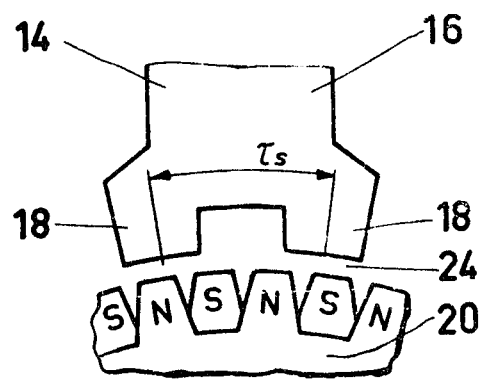
FIG. 2 is a detail of the structure in FIG. 1.
Figure 3:
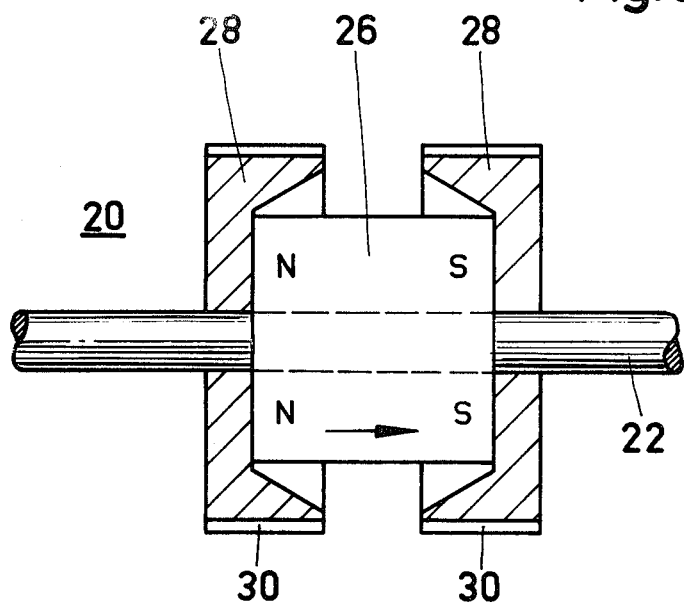
FIG. 3 is a section III–VIII of the rotor of the motor in FIG. 1.

In the five-phase motor 10 of FIGS. 1, 2, and 3, stator windings 12 embrace ten inwardly-extending radially-arranged stator poles generally identified as 14 and specifically identified as I to X, of a stator 16. The number of poles, 10, represents $5 \times u$, where $u$ = the number of pole groups and in this case is equal to 2. The stator poles also extend longitudinally along the stator axis.

The stator 16 is composed of a number of stator laminations or sheets or plates that form the poles 14 as salient stator main poles which are completely or partly wound by the windings 12. As more fully shown in FIG. 2 the poles end in $n + 1$ stator pole teeth 18, where $n$ is a whole number $\geq 0$.

A rotor 20 rotates a shaft 22 along the axis of the stator 16 and forms an operating air gap 24 between the stator 16 and the rotor 20. As more fully shown in FIG. 3, an axially magnetized permanent magnet 26 is sandwiched between two soft magnetic pole caps or pole shoes 28 each of which terminates radially at their peripheries in radially extending rotor teeth 30. As shown in FIG. 2, the rotor teeth 30 on each of the pole shoes 28 are equally spaced and the teeth on one pole shoe are circumferentially offset relative to the teeth of the other shoe by one-half tooth pitch.

The pitch between stator teeth 18, or the stator tooth pitch, i.e. the angular spacing between like portions of adjacent teeth, is $T_S$. According to the aforementioned copending application, the angular pitch between the closest teeth on adjacent poles within any one of the $u$ pole groups is $\alpha$ and $$\alpha = T_S(K + 0.6).$$

The value $K$ is simply a whole number equal to or greater than 0.

According to the aforementioned copending application the angular pitch between the closest teeth on adjacent poles in adjacent pole groups is $\beta$ and $$\beta = T_S(K' + 0.6).$$

The value $K'$ is a whole number equal to or greater than 0.

In the embodiments of the present invention $K = K'$. Thus $\alpha = \beta$. Thus there exists but a single pitch between adjacent teeth of adjacent poles. $T_S$ is again the stator pole pitch.

In the aforementioned copending application the number of rotor teeth on each pole cap is $$Z_R = u(5n + 4K + K' + 3).$$

In one embodiment of that application, where $K = K'$ it is $$Z_R = 5u(n + K + 1)$$

The rotor tooth pitch in each pole cap is $$T_R = 360°/Z_R.$$

In the embodiment of the present invention the number of rotor teeth on each pole cap 28 is $$Z_R = 5u(n + 1) \pm gu$$

where $g$ is a whole number and $1 \leq g \leq 4$.

Put another way:

$$Z_R = 5u(n + 1) + gu$$

where $g$ is a whole number and $-4 \leq g \leq -1$; $1 \leq g \leq 4$.

According to the specific embodiment shown in FIGS. 1, 2, and 3, $n = 1$, $u = 2$, and $g = +4$. Thus $Z_R = 28$.

Other embodiments of the motor according to the invention are constructed as disclosed with respect to FIGS. 1, 2, and 3. However, the number of rotor teeth on each pole shoe 30 is different in each of these embodiments. Nevertheless in each embodiment the number of rotor teeth follows the relationship $$Z_R = 5u(n + 1) + gu;$$

where $1 \leq g \leq 4$, $-4 \leq g \leq -1$.

Figure 4:
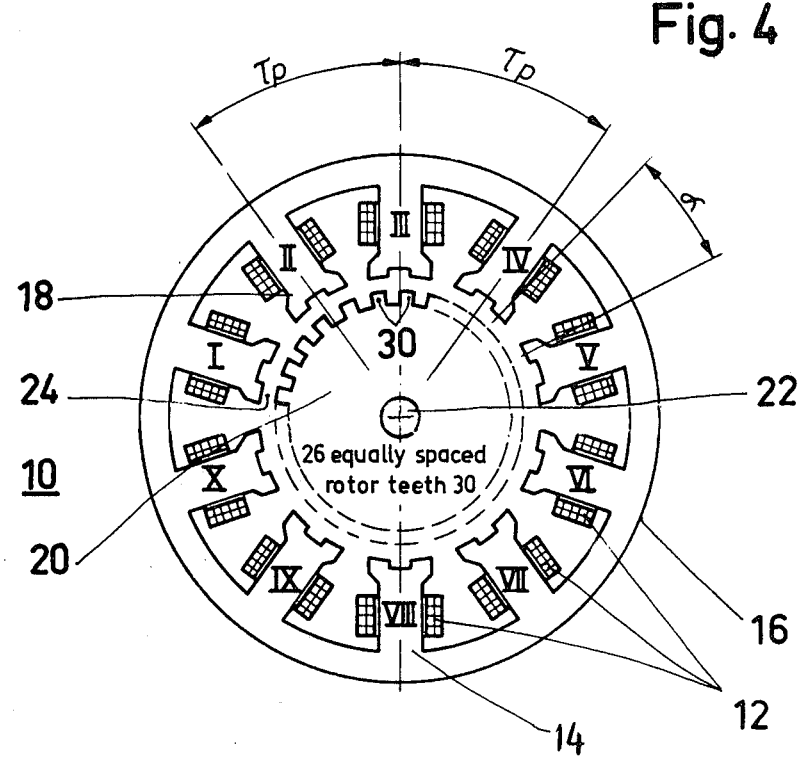
FIGS. 4 to 10 are sectional views of other motors embodying features of the invention.

According to one of these other embodiments $g = 3$, $n = 1$, $u = 2$. Thus $Z_R = 26$. A view of this embodiment is shown in FIG. 4.

Figure 5:
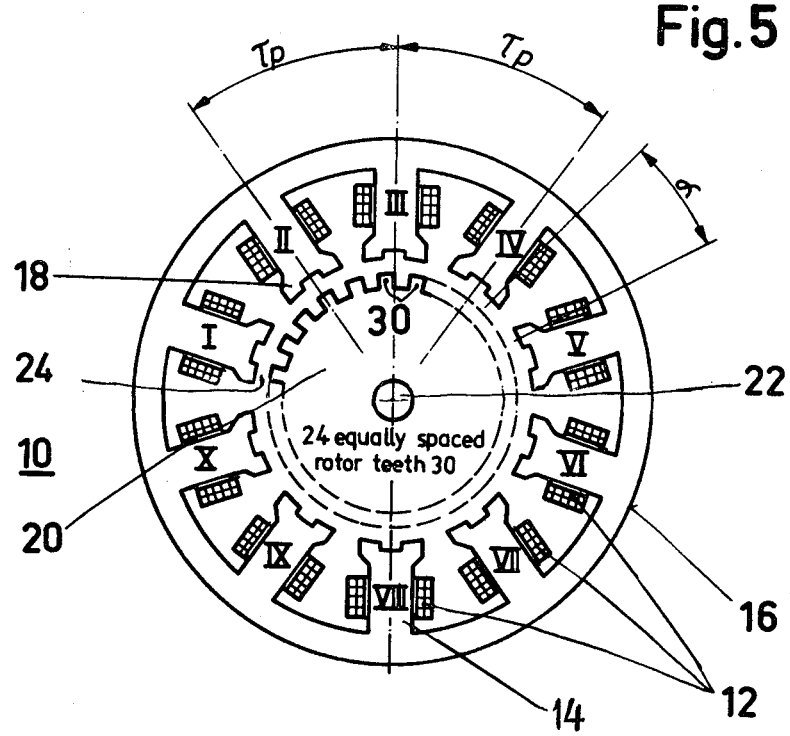

According to another of these other embodiments, shown in FIG. 5, $g = 2$, $n = 1$, $u = 2$. Thus $Z_R = 24$.

Figure 6:
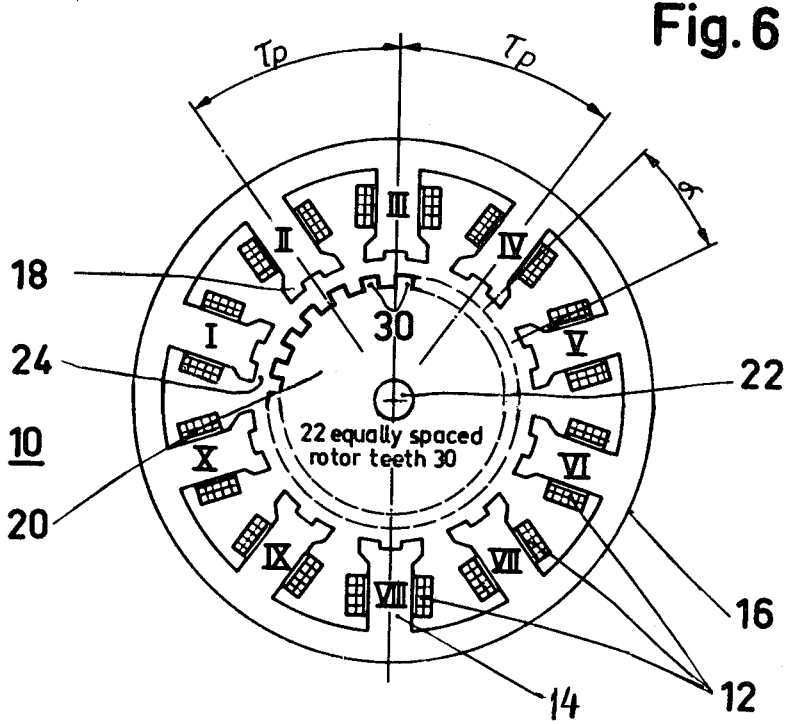

In the embodiment shown in FIG. 6, $g = 1$, $n = 1$, $u = 2$. Thus $Z_R = 22$.

Figure 7:
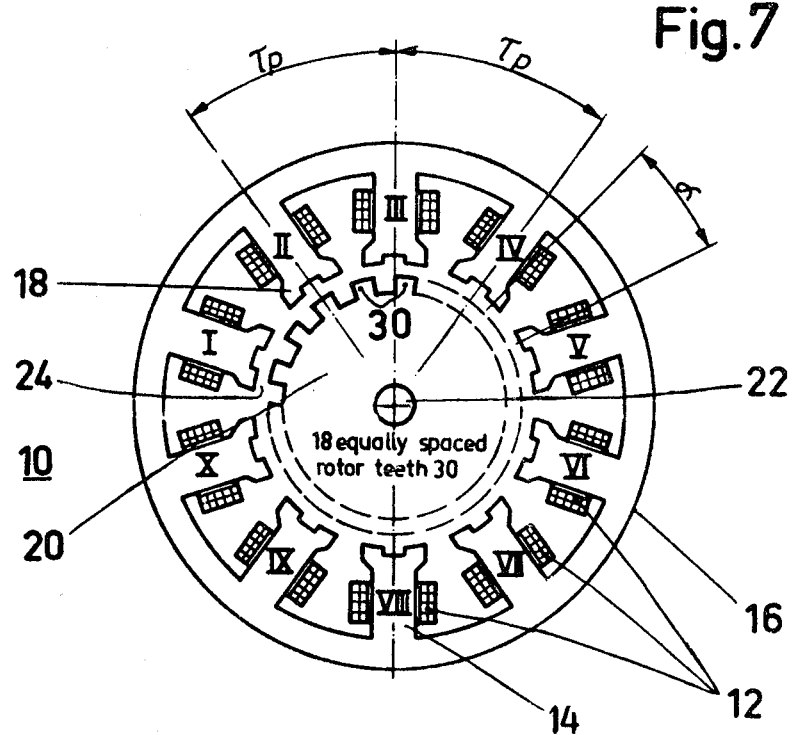

In FIG. 7, $g = -1$, $n = 1$, $u = 2$. Here $Z_R = 18$.

Figure 8:
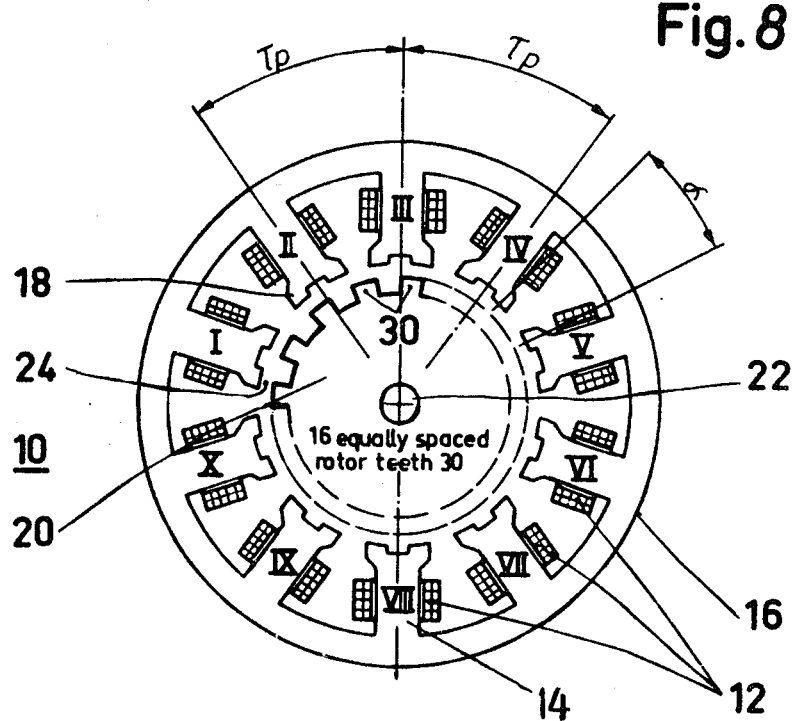

In FIG. 8, $g = -2$, $n = 1$, $u = 2$; hence $Z_R$ is 16.

Figure 9:
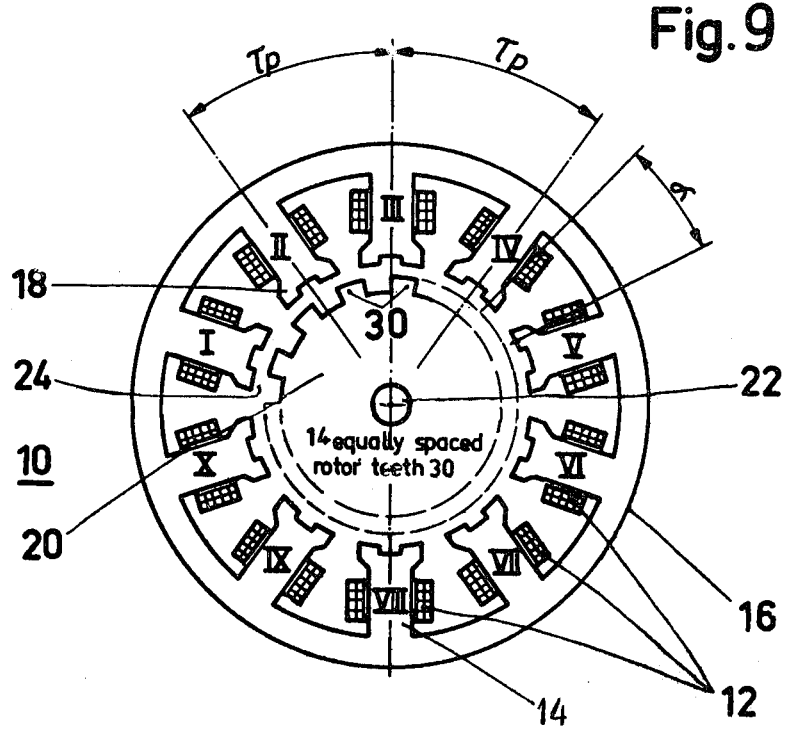

In FIG. 9, $g = -3$, $n = 1$, $u = 2$; hence here $Z_R = 14$.

Figure 10:
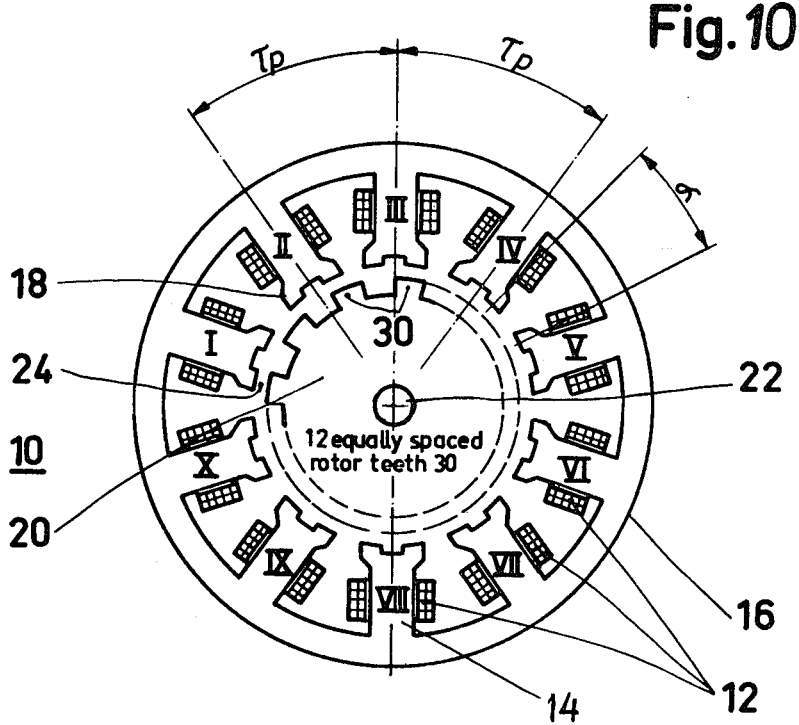

In FIG. 10, $g = -4$, $n = 1$, $u = 2$; hence here $Z_R = 12$.

Thus, according to the invention for any one stator structure, where $K = K'$, the rotor may be embodied in one of eight different structures.

The eight different structures illustrated in FIGS. 1 to 10 are, according to the invention, wound and energized in the various ways disclosed in the aforementioned copending application Ser. No. 500,001. Thus, each of the eight structures when wound and energized according to one of these various disclosed arrangements constitutes another embodiment of the invention.

To illustrate the pole windings and their energization, the stator poles 14 of FIGS. 1 to 10 are more specifically designated I through X. There are $u = 2$ pole groups, an upper group of five poles I to V and a lower group XI to X, as shown. The windings 12 are wound about the poles 14, interconnected and energized, in one of the particular ways illustrated in FIGS. 11 to 22.

FIGS. 11, 12, and 13, respectively, illustrate one of the phase interconnections, switching sequences and winding arrangements about the stator poles 14 in FIGS. 4, 5, 8, and 9.

In these figures, $g = \pm 2$ and $\pm 3$ in the equation $$Z_R = 5u(n + 1) + gu.$$

Thus, where $u = 2$, and $n = 1$, the arrangements of FIGS. 11, 12, and 13 apply to motors with rotors having 26, 24, 16, and 14 teeth.

In FIG. 11, a power source E applies energy to five phases $W_1$ to $W_5$ of the windings 12 which are interconnected in the order $W_1$, $W_2$, $W_3$, $W_4$, $W_5$ as shown in FIG. 13. Switches $S_1$ to $S_5$ connect the phases $W_1$ to $W_5$ of the windings 12 to the source E in the sequence shown in FIG. 12. Here, one stator pole per group always remains unexcited. FIG. 12 also illustrates the change of polarity of the 2 × 5 stator poles of a five phase pole group for a full cycle.

According to another embodiment of the invention, the two windings per phase shown in FIG. 13 are connected in series instead of in parallel.

In FIGS. 1 to 10, the angular tooth pitch $T_R$ of the teeth on each of the rotors is $$T_R = 360°/Z_R$$

In FIGS. 11, 12, and 13, the windings operate upon the system so that for each step the rotor moves an angle $T_R/10$. Alternatively, the stepping angle $A_S = T_R/10 = (360/Z_R)/10 = 36/Z_R$.

Thus in FIG. 4, where $Z_R = 26$, windings 12 operating according to FIGS. 11 - 13 produce a stepping angle $A_S = 36/26 = 1.3846°$.

In FIG. 5, where $Z_R = 24$ windings 12 operating according to FIGS. 11 - 13 produce a stepping angle $A_S = 36/24 = 1.5°$.

In FIG. 8, where $Z_R = 16$, windings 12 operating according to FIGS. 11 - 13 produce a stepping angle $A_S = 36/26 = 1.0°$.

In FIG. 9, where $Z_R = 14$, windings 12 operating according to FIGS. 11 - 13 produce a stepping angle $A_S = 36/34 = 1.059°$.

FIGS. 14, 15, and 16, respectively, illustrate phase interconnections, switching sequence, and a winding arrangement about the stator poles for FIGS. 1-3, 6, 7, and 10, so as also to produce a stepping angle $A_S = T_R/10$. These figures represent the embodiments of $g = ±1$ and $±4$ in the equation $$Z_R = 5u(n + 1) + gu.$$

Thus FIGS. 14, 15, and 16 represent the interconnections, switching and winding respectively for motors with rotors having 28, 22, 18, and 12 teeth. Here the windings are arranged in the order $W_1$, $W_4$, $W_2$, $W_5$, $W_3$. Here again, switches $S_1$ to $S_5$ apply power from a source E to the five phases $W_1$ to $W_5$. One stator per pole group always remains unexcited.

For the structure of FIG. 1, where $Z_R = 28$, the stepping angle $A_S = T_R/10 = (360/Z_R)/10 = 36/Z_R = 36/28 = 1.286°$.

When the interconnection, sequence and winding arrangement of FIGS. 14, 15, and 16 are applied to the structure of FIG. 6, where $Z_R = 22$, $A_S = 36/22 = 1.636°$.

For the structure of FIG. 7, where $Z_R = 18$, windings 12 operating according to FIGS. 14 - 16, produce a stepping angle $A_S = 2.0°$.

For FIG. 10, where $Z_R = 12$, windings 12 operating according to FIGS. 14 - 16, produce a stepping angle $A_S = 3.0°$.

According to other embodiments of the invention, it is possible to obtain stepping angles $A_S = T_R/20$. This is done by connecting the windings and energizing them in accordance with the diagrams of FIGS. 17, 20 and 21.

Figure 17:
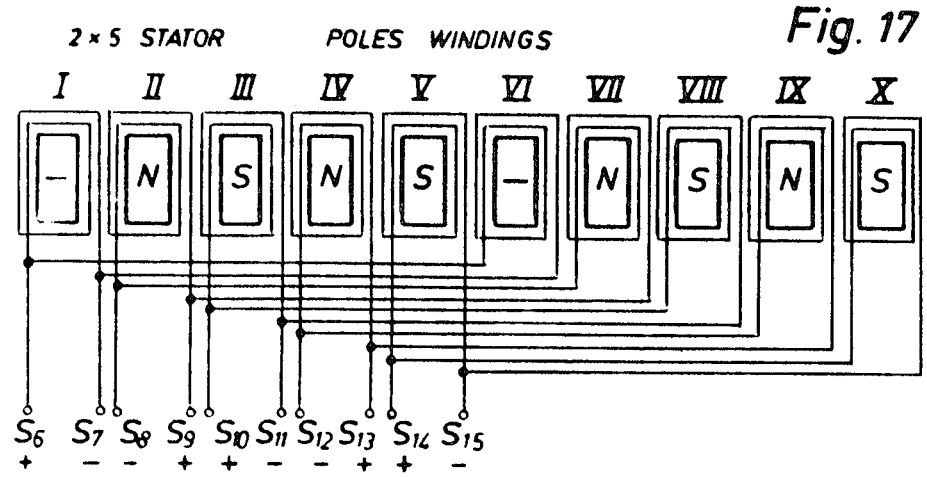
FIGS. 17, 18, 19, 20 and 21 are respectively a pole winding diagram, a circuit switching diagram, a switching table, a polarity table, and a tooth position arrangement table for another circuit which when applied to the structures of FIGS. 1 to 10 embody features of the invention.
Figure 18:
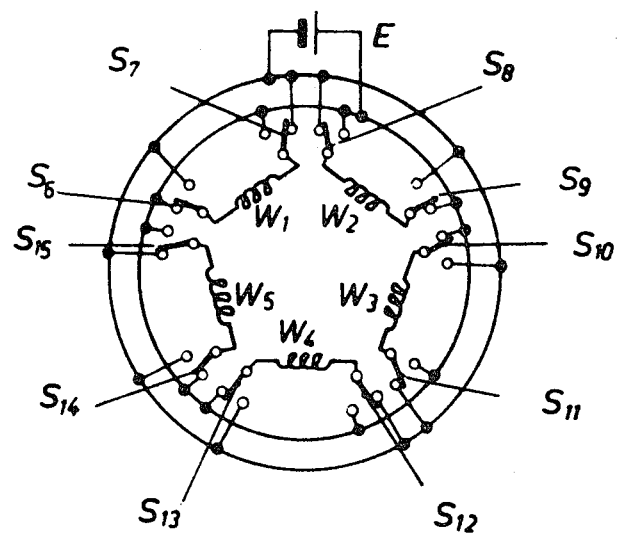
Figure 19:
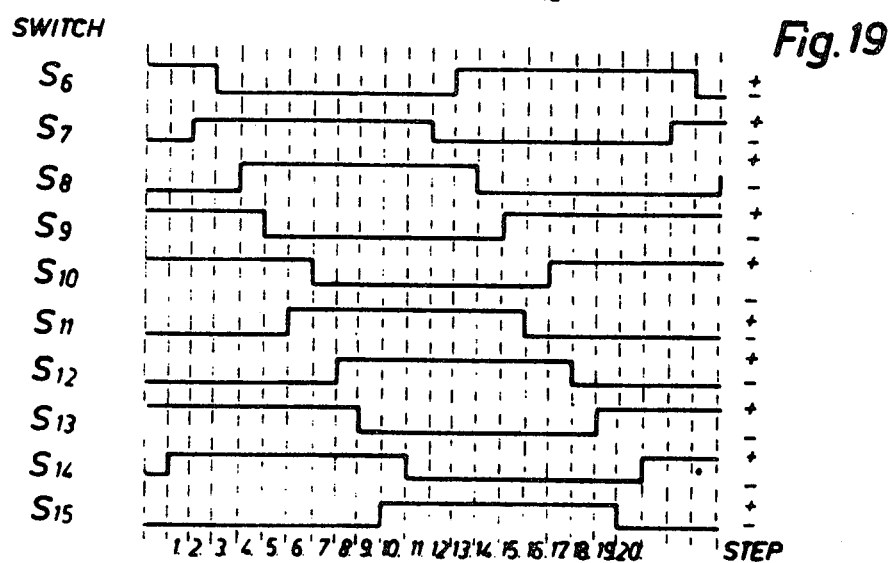
Figures 20, 21:
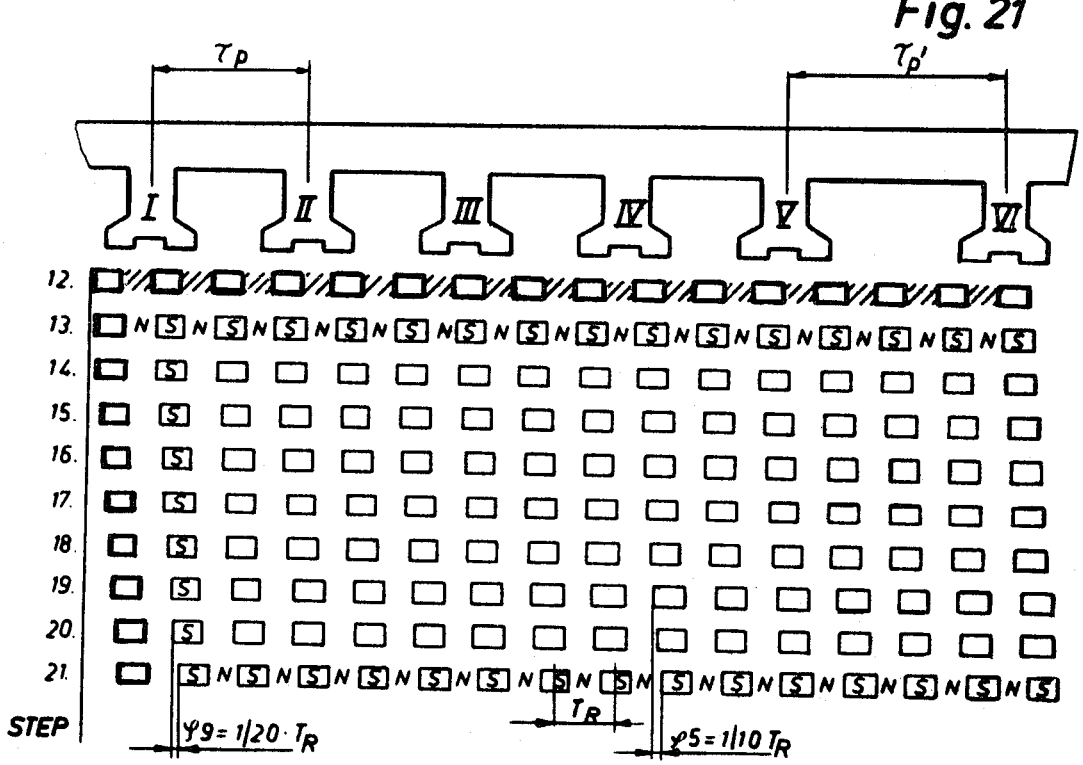

Here, switches $S_6$ to $S_{15}$ operate as shown in FIGS. 18 and 19 and are connected to the windings about the stator poles as shown in FIG. 17. They produce the polarities of FIG. 20 and the position of FIG. 21; more specifically, if the ten windings I to X are connected as shown in FIG. 17, and the five stator pole windings W1 to W5 thus formed connected to the current source E in FIG. 18 through the ten transfer switches $S_6$ to $S_{16}$, and if the switches are actuated according to the switch position diagram in FIG. 19, the polarity state shown in the table of FIG. 20 for the 10 poles at the control steps 1 to 21 is obtained. FIG. 21 represents the development of six poles of a schematized motor with 10 poles. To this end, each respective rotor position is shown according to the polarity states from the 12th to the 21st step of FIG. 19. It can be seen that the motor moves from step to step by $1/20$ $T_R$. Every second position is identical to a position of the previously described selection circuit of FIGS. 11 to 13, where the rotor moves from step to step by $1/10$ $T_R$.

According to other embodiments of the invention, the number of steps per rotary revolution is varied utilizing these same mechanical motor constructions. The condition for still higher numbers of steps per rotor revolution is satisfied, according to the invention by operating the circuit of FIG. 22 to produce the polarity sequence of the table in FIG. 23. In the circuits of FIGS. 11 to 21, an entire phase winding W, embracing for example of two main pole windings, is connected or disconnected. According to the embodiments disclosed in FIGS. 22 and 23, only one pole winding W/2 of a phase winding W is connected, disconnected, or switched per unit time.

Figures 22, 23:
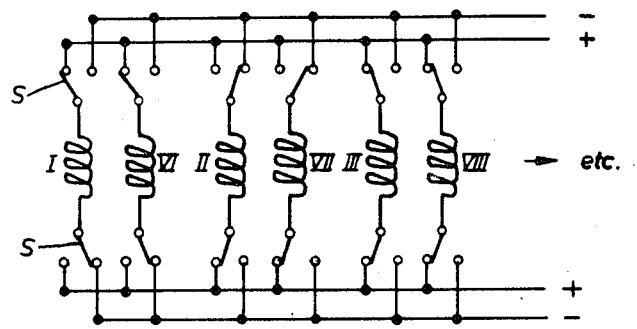
FIGS. 22 and 23 are a circuit diagram and a polarity sequence table for another winding and energizing arrangement for application to the structures of FIGS. 1 to 10, and embodying features of the invention.

According to the polarity state table of FIG. 23 for the circuit of FIG. 22, only the winding of pole I is disconnected in the first step, while the winding of pole VI remains connected. Only in the second step is the winding of pole VI similarly disconnected (unexcited) according to the invention. This way, the stepping angle $\phi = 1/20 \times T_R$ corresponding to the circuit of FIG. 18, is, according to the invention, cut in half to $\phi$ $22 - 1/40 \times T_R$. In the motor with the selection circuit of FIG. 22, with $T_R$ equal to 28 rotor teeth, a stepping angle of $360°/28 \times 40 = 0.32°$ and 1120 steps per rotor revolution is obtained.

Figure 24:
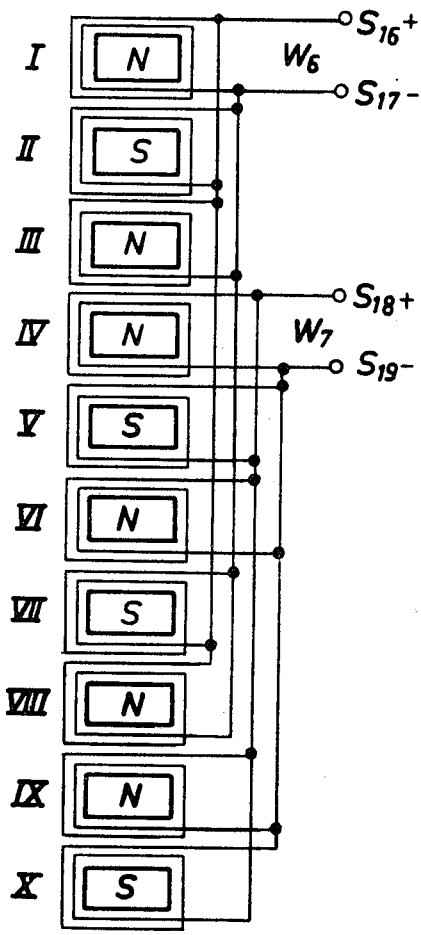
FIGS. 24, 25 and 26 are a winding circuit diagram, a switching circuit diagram, and polarity energizing diagram for a circuit applicable to the structures of FIGS. 1 to 10, and embodying features of the invention.
Figure 25:
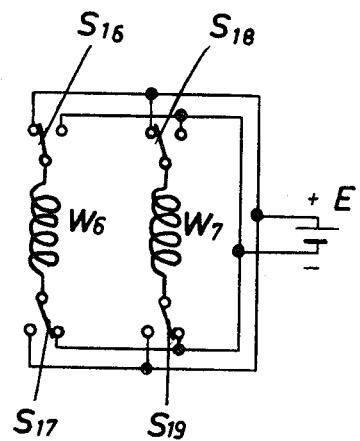
Figure 26:
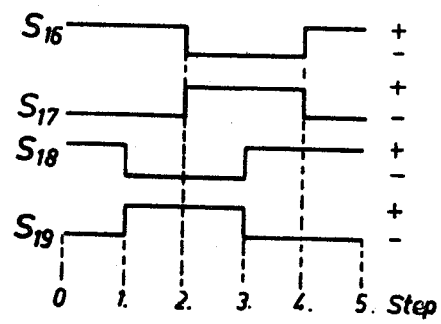

According to embodiments of the invention the condition for other numbers of steps per rotor revolution is satisfied when the stator windings of pole I to X corresponding to the two-phase windings $W_6$ and $W_7$ are connected with each other as shown in FIG. 24 and excited with a current source through the switch arrangement of FIG. 25 as shown in FIG. 26.

The winding $W_6$ is composed of the stator windings of poles I, II, III, VII and VIII. The latter are connected with each other and excited so that juxtaposed poles exhibit different polarities.

The winding $W_7$ is composed of the stator windings of poles IV, V, VI, IX, and X, and the latter are connected with each other in a manner corresponding to winding $W_6$.

Each winding is thus composed of two mutually overlapping groups of stator windings, with one group embracing three stator poles and the other group embracing two stator main poles.

Figure 27:
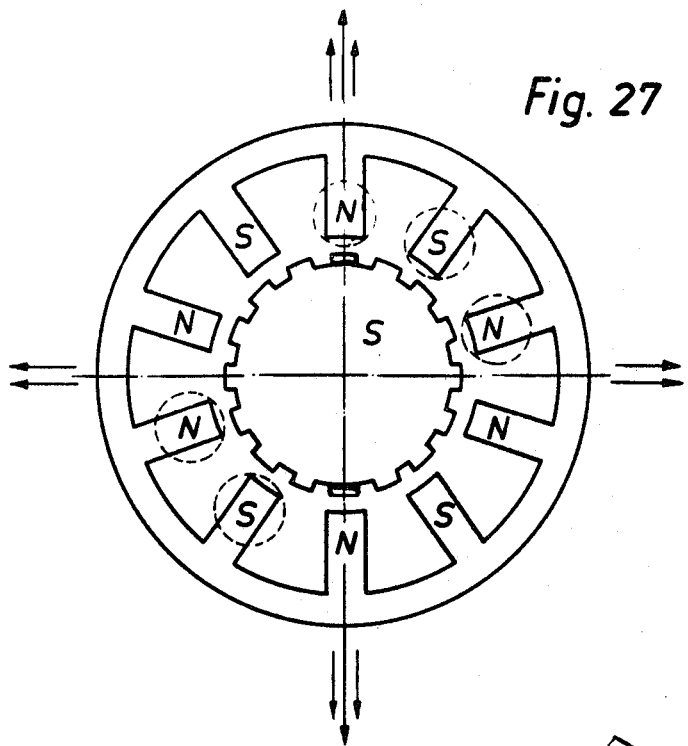
FIGS. 27 through 30 illustrate the operation of motors utilizing the windings of FIGS. 24 through 26.
Figure 28:
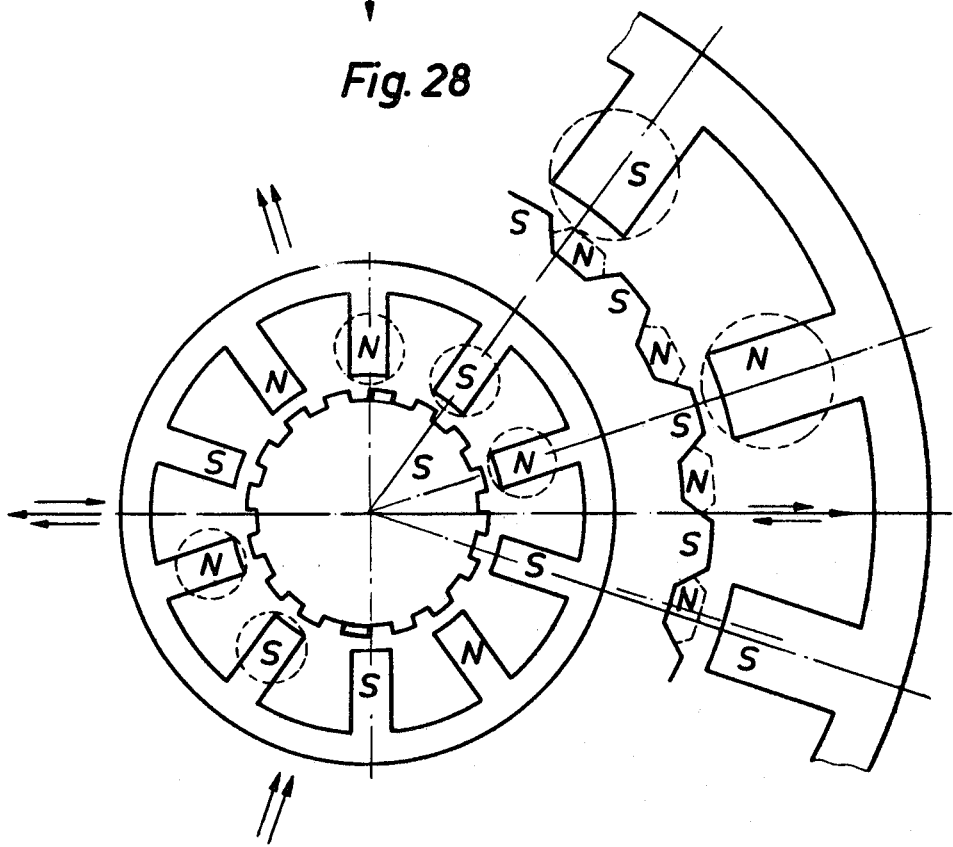
Figure 29:
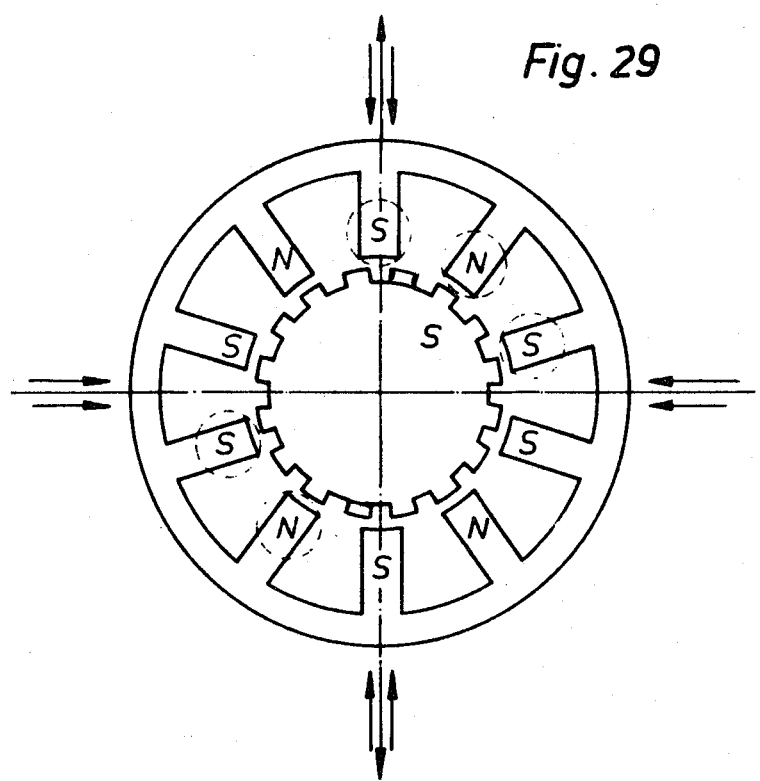
Figure 30:
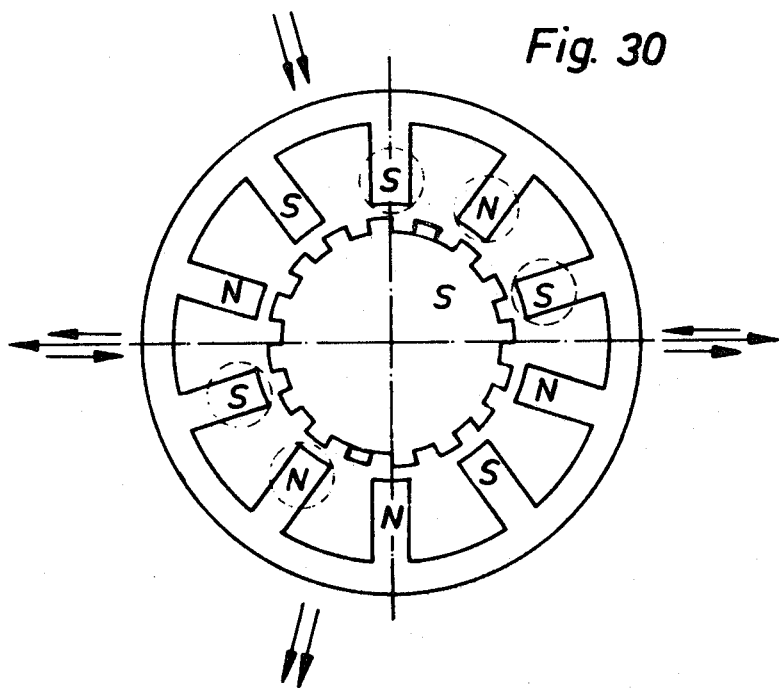

Actuating the switches $S_{16}$ to $S_{19}$ produces the particular polarity states illustrated in FIGS. 27 and 30 for the individual steps. That is to say, FIGS. 27 to 30 show the rotary movement of the rotor as a result of the switching of the windings in a motor embodying the invention where P=10, $n=0$ and $Z_R=16$. In such a motor the rotor is moved by $T_R/4$. This is done by forming the magnetic attraction regions on the circumference of the working gap. The regions' centers change 90° from step to step as shown schematically in FIGS. 27 and 28.

According to an embodiment of the invention, the number of North South poles changes step by step from $3u$ North and $2u$ South poles at one step to $2.5u$ North and $2.5u$ South poles at another, as well as to $2u$ North and $2u$ South poles at another. Thus only an even number of groups $u=2$ can be used for this division. According to another embodiment of the invention, a motor with $Z_R=28$ rotor teeth and $T_R=12.86°$ with the above described winding arrangement and selection circuit has a stepping angle of 3.2° corresponding to 112 steps per rotor revolution. According to another embodiment of this invention this angle is cut in half to $\phi = 1.6°$, and 224 steps per revolution are obtained by alternately exciting two phases at one time during one step and only one of the phases the next step.

According to other embodiments of the invention, this motor is also operated, using the aforementioned winding arrangement, as a two-phase synchronous motor with an auxiliary condensor phase. The synchronous speed is $60f/Z_R$ R.P.M.

Figure 31:
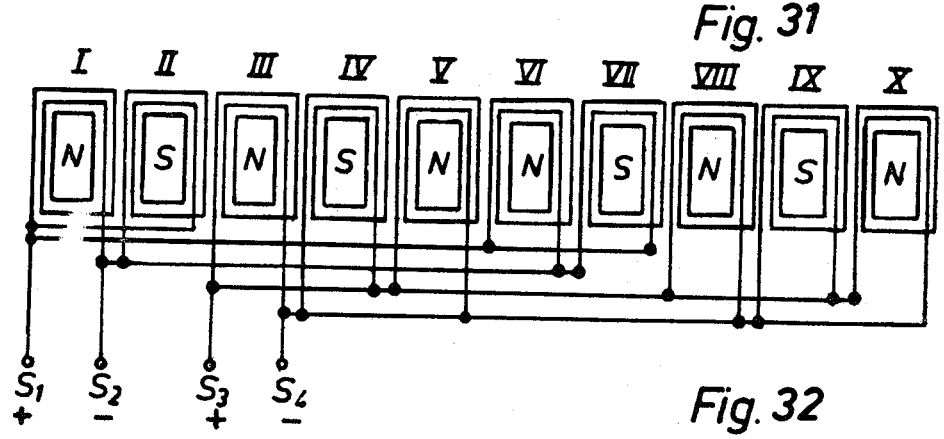
FIGS. 31, 32 and 33 are winding diagrams and motor schematic diagrams illustrating another winding and energizing arrangement applicable to the structures of FIGS. 1 to 10 and its effects.
Figure 32:
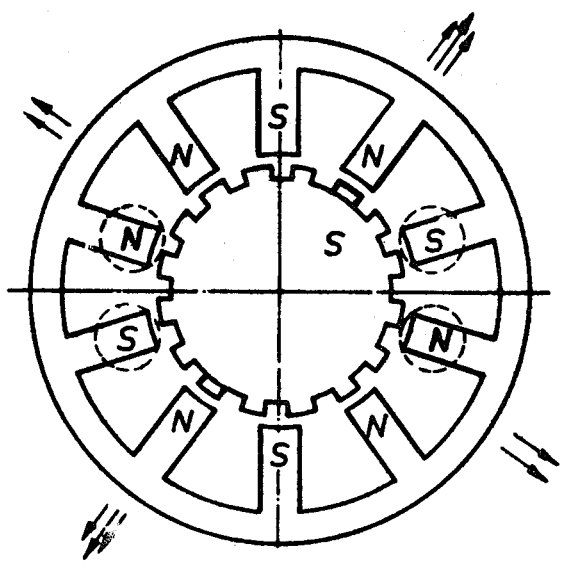
Figure 33:
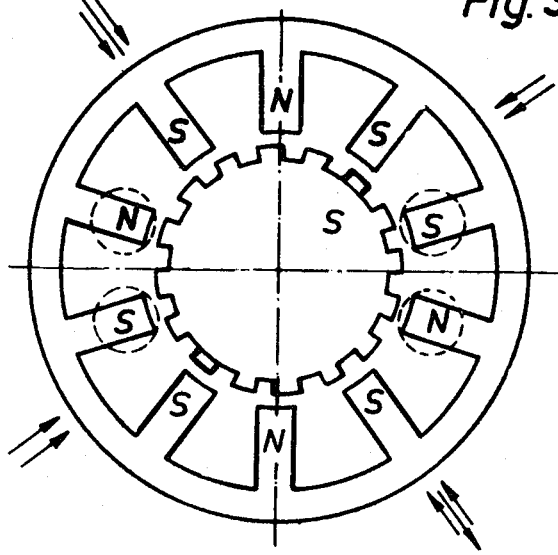

According to other embodiments of the invention a $(3/2)u$ division is used. This makes it possible also to use motor layouts with an odd group number $n=1$. FIGS. 31 to 33 illustrate this principle. In the example of FIG. 32, showing a motor with ten main poles, the poles, I, II, V, VI, VII and X form one phase, and the poles, II, IV, VIII and IX form the other phase. As shown in FIGS. 32 and 33, two magnetic attraction regions are again formed with the number of north and south poles changing from step to step. However, at every fourth or sixth step, the individual polarity states are identical to the polarity state diagram in the five-phase operation outlined in FIG. 20. With the polarity sequence according to the switch positions of FIG. 26, step angles varying from step to step, namely in the sequence $(3/10)T_R$, $(2/10)T_R$, and $(3/10)T_R$, etc. prevail. The sum of two successive angles is always the same, namely $(\frac{1}{2})T_R$.

According to another embodiment of the invention, the motor, when operating as a synchronous motor, has the same rotary speed as the motor described with respect to FIGS. 27 to 30. If such a motor is to be driven as a stepping motor, external circuit means, such as high resistance or constant current regulators, cause the phase currents to have equal values.

With a parallel circuit, and when all $5u$ windings have equal winding data, the phase current divides itself over $3u$ poles in one phase and $2u$ poles in the other phase. In a motor whose working point is below the knee of the magnetization characteristic, the stepping angle of $(3/10)T_R$ is thus slightly reduced, and the following stepping angle of $(2/10)T_R$ is slightly increased. On the average, a stepping angle of $(\frac{1}{4})T_R$ prevails.

The present invention thus permits formation of forty different stepping angles with a minimum number of mechanical motor structures by changing the winding and switching arrangement. The invention permits operation of the motor with optimum performance in two-phase connection according to FIG. 25 as a two-phase synchronous or single phase condensor motor. This affords considerable economic and manufacturing advantages for these motors.

The switches shown in each circuit form part of a control system. They are switched by any suitable known means. An example of such known means is disclosed specifically in FIG. 8 and columns 4 of U.S. Pat. No. 3,842,332.

While specific embodiments of the invention have been shown and described in detail to illustrate the application of the inventive principles, it will be obvious to those skilled in the art that the invention may be embodied otherwise without departing from its spirit and scope.

What is claimed is:

1. In a five-phase stepping motor including
   a permanent magnet rotor having on its periphery a plurality of circumferentially spaced, radially outwardly directed rotor teeth,
   a stator surrounding said rotor and having a plurality of circularly arranged, radially inwardly directed stator poles disposed in $u$ pole groups of five poles each, each of said stator poles having $n + 1$ pole teeth on its end face directed toward said rotor with $n$ being a whole number $\geq 0$, and
   a corresponding plurality of stator windings wound about said stator poles, respectively, said stator windings forming a plurality of connecting points adapted to be selectively connected by respective control means to a power source for selective energization of said stator windings;
   the improvement which comprises the provision, in combination with a single stator, of a set of eight rotors having respective different numbers of rotor teeth $Z_R$ but with each such number defined by the relation $Z_R = 5u (n + 1) + gu$, where $g$ is a whole number from 1 to 4, so that with one and the same stator and associated control of the stator windings the number of rotor teeth can be selectively varied to provide a motor with any one of eight different step angles.

2. A stepping motor according to claim 1, wherein, for attainment of the largest desired step angle ($2.5\phi$) or operation of the motor as a two-phase stepping motor, a set of rotors is provided the numbers of the rotor teeth of which ($Z_R$) are defined by said relation with $g = 2$ or $g = 3$, and on the five stator poles of each pole group the respective stator windings are arranged to be connected to each other in the straight sequence I, II, III, IV and V.

3. A stepping motor according to claim 1, wherein, for attainment of the largest desired step angle ($2.5\phi$) or operation of the motor as a two-phase stepping motor, a set of rotors is provided the numbers of the rotor teeth of which ($Z_R$) are defined by said relation with $g = 1$ or $g = 4$, and on the five stator poles of each pole group the respective stator windings are arranged to be connected to each other in the modified sequence I, IV, II, V and III.

4. In a five-phase stepping motor including
   a permanent magnet rotor having on its periphery a plurality of circumferentially spaced, radially outwardly directed rotor teeth,
   a stator surrounding said rotor and having a plurality of circularly arranged, radially inwardly directed stator poles disposed in $u$ pole groups of five poles each, each of said stator poles having $n + 1$ pole teeth on its end face directed toward said rotor with $n$ being a whole number $\geq 0$, and a corresponding plurality of stator windings wound about said stator poles, respectively, said stator windings forming a plurality of connecting points adapted to be selectively connected by respective control means to a power source for selective energization of said stator windings for operation in one of five stepping angle modes and in a five-phase or a two-phase relationship;

the improvement which comprises the provision, in combination with a single stator, of a set of eight rotors having respective different numbers of rotor teeth $Z_R$ but with each such number defined by the relation $Z_R = 5u(n + 1) \pm gu$, where $g$ is a whole number from 1 to 4, so that with one and the same stator and associated control of the stator windings the number of rotor teeth can be selectively varied to provide a motor with any one of 40 different step angles.

5. A stepping motor according to claim 4, wherein, for attainment of the largest desired step angle (2.5φ) or operation of the motor as a two-phase stepping motor, a set of rotors is provided the numbers of the rotor teeth of which ($Z_R$) are defined by said relation with $g = 2$ or $g = 3$, and on the five stator poles of each pole group the respective stator windings are arranged to be connected to each other in the straight sequence I, II, III, IV and V.

6. A stepping motor according to claim 4, wherein, for attainment of the largest desired step angle (2.5φ) or operation of the motor as a two-phase stepping motor, a set of rotors is provided the numbers of the rotor teeth of which ($Z_R$) are defined by said relation with $g = 1$ or $g = 4$, and on the five stator poles of each pole group the respective stator windings are arranged to be connected to each other in the modified sequence I, IV, II, V and III.

* * * * *

UNITED STATES PATENT AND TRADEMARK OFFICE
CERTIFICATE OF CORRECTION

PATENT NO. : 4,095,161
DATED : June 13, 1978
INVENTOR(S) : Günter Heine et al.

It is certified that error appears in the above-identified patent and that said Letters Patent are hereby corrected as shown below:

On the title page, left column, in the name of the assignee, for "Messgerüte" read --Messgeräte--.

Column 1, line 32, for "prevision" read --precision--.
Column 5, line 32, for "$A_S = 36/26 = 1.0°$" read --$A_S = 36/16 = 2.25°$--; line 35, for "$A_S = 36/34 = 1.059°$" read --$A_S = 36/14 = 2.57°$--. Column 8, line 33, for "$Z_R = 5u(n+1)+gu$" read --$Z_R = 5u(n+1)\pm gu$--.

Signed and Sealed this

Tenth Day of April 1979

[SEAL]

Attest:

RUTH C. MASON
Attesting Officer

DONALD W. BANNER
Commissioner of Patents and Trademarks